(12) United States Patent
Baker et al.

(10) Patent No.: US 8,234,522 B2
(45) Date of Patent: Jul. 31, 2012

(54) COMPUTING DIAGNOSTIC EXPLANATIONS OF NETWORK FAULTS FROM MONITORING DATA

(75) Inventors: Donald Baker, Austin, TX (US); Marian Nodine, Austin, TX (US)

(73) Assignee: Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 12/554,016

(22) Filed: Sep. 4, 2009

(65) Prior Publication Data

US 2010/0115341 A1    May 6, 2010

Related U.S. Application Data

(60) Provisional application No. 61/094,272, filed on Sep. 4, 2008.

(51) Int. Cl.
*G06F 11/00* (2006.01)
(52) U.S. Cl. .......................................................... 714/26
(58) Field of Classification Search ...................... 714/26
See application file for complete search history.

(56) References Cited

U.S. PATENT DOCUMENTS

| | | | | |
|---|---|---|---|---|
| 5,528,516 | A * | 6/1996 | Yemini et al. | 702/181 |
| 5,661,668 | A | 8/1997 | Yemini et al. | |
| 6,076,083 | A * | 6/2000 | Baker | 706/52 |
| 6,535,865 | B1 * | 3/2003 | Skaaning et al. | 706/52 |
| 6,662,323 | B1 * | 12/2003 | Ashar et al. | 714/724 |
| 7,113,988 | B2 * | 9/2006 | Chirashnya et al. | 709/224 |
| 2003/0046390 | A1 * | 3/2003 | Ball et al. | 709/224 |
| 2005/0028033 | A1 * | 2/2005 | Kipersztok et al. | 714/27 |
| 2005/0096854 | A1 | 5/2005 | Larsson et al. | |
| 2005/0216871 | A1 * | 9/2005 | Prasad et al. | 716/4 |
| 2008/0039993 | A1 | 2/2008 | Cleary et al. | |
| 2008/0209269 | A1 | 8/2008 | Brodie et al. | |
| 2009/0094076 | A1 * | 4/2009 | Reddy | 705/7 |
| 2009/0182698 | A1 * | 7/2009 | Bethke et al. | 706/47 |
| 2009/0265296 | A1 * | 10/2009 | Narain et al. | 706/47 |
| 2011/0231356 | A1 * | 9/2011 | Vaidyanathan et al. | 706/52 |

OTHER PUBLICATIONS

Malgorzata Steinder and Adarshpal S. Sethi, "Probabilistic Fault Localization in Communication Systems Using Belief Networks", IEEE/ACM Transactions on Newtorking, Oct. 2001, pp. 809-822, vol. 12 No. 5.

Stephen A. Cook, "The Complexity of Theorem-Proving Procedures", Third Annual ACM Symposium on Theory of Computing, (1971), pp. 1-8.

(Continued)

*Primary Examiner* — Amine Riad
(74) *Attorney, Agent, or Firm* — Philip J. Feig

(57) ABSTRACT

A system and method for network fault diagnosis in a network having network elements is presented. The method comprises creating a network causality model, generating Boolean expressions from the network causality model, converting the Boolean expressions into SAT sets, receiving network monitoring results, correlating these monitoring results with the SAT sets, and enumerating all possible diagnostic explanations of potential faults, properly annotated. Creating a network causality model can comprise creating, for each network element, an element-specific causality model, stitching together all network elements using the element-specific causality models and a network topology, retrieving monitoring state and propagation information, and generating the network causality model using the stitched together network elements and the monitoring state and propagation information. Stitching together network elements can comprise adding causes and implies dependency between appropriate network elements and/or adding and connecting reachable and not-reachable states. The network causality model can comprise network element states.

12 Claims, 6 Drawing Sheets

OTHER PUBLICATIONS

Masum Hasan, et al. "A Conceptual Framework for Network Management Event Correlation and Filtering Systems", Proceedings of the Sixth IFIP/IEEE International Symposium on Integrated Management, (1999), pp. 1-14.

A.T. Bouloutas, et al. "Alarm Correlation and Fault Identification in Communication Networks", IEEE Transactions on Communications, Feb./Mar./Apr. (1995), pp. 523-533, vol. 42, No. 2/3//4.

Yijiao Yu, et al. "A Graph-Based Proactive Fault Identification Approach in Computer Networks", Computer Communications 28 (2005), pp. 366-378.

Boris Gruschke. "A New Approach for Event Correlation based on Dependency Graphs", Workshop of the Open/View University Association, (1998). pp. 1-8.

M. Moskewicz, et al., "Chaff: Engineering an Efficient SAT Solver," 39th, Design Automation Conference ,DAC 2001, Las Vegas; Jun. 2001.

L. Zhang, et al., "The Quest for Efficient Boolean Satisfiability Solvers," in Proceedings of 14th Conference on Computer Aided Verification,CAV2002, Copenhagen, Denmark, Jul. 2002.

International Search Report dated Apr. 22, 2010 (3 Pages).

* cited by examiner

COMPUTING DIAGNOSTIC EXPLANATIONS OF NETWORK FAULTS FROM MONITORING DATA

CROSS REFERENCE TO RELATED APPLICATIONS

The present invention claims the benefit of U.S. provisional patent application 61/094,272 filed Sep. 4, 2008, the entire contents and disclosure of which are incorporated herein by reference as if fully set forth herein.

GOVERNMENT LICENSE RIGHTS

This invention was made with Government support under DAAE07-03-9-F001 awarded by the Department of the Army. The Government has certain rights in this invention.

FIELD OF THE INVENTION

The present invention relates generally to network management and to network fault diagnosis.

BACKGROUND OF THE INVENTION

Diagnosing the causes of network faults is the first step in their correction, either by restoring the network to full operation or by reconfiguring the network to mitigate the impact of a fault. Fault diagnosis is relatively straightforward if one has information about the state of all active elements in the network. Unfortunately, such monitoring information is usually transmitted through the network itself to a network management system (NMS) that processes the information for diagnosis. Thus, the existence of a fault can impede the gathering of information about the fault and other faults in the network. This problem can be reduced, but not solved, by distributing NMS functionality through the network. While distributing fault diagnosis among multiple NMSs allows for multiple perspectives, coordination between the NMSs also can be impacted by the same network faults they are trying to diagnose and repair. However, distributing the NMS capabilities also allows for various domains of the network to be managed autonomously, thus avoiding the problem of a single point of failure.

The most common approach to network fault diagnosis is known as the fault propagation approach, which leverages a model of how faults propagate through a network. For example, the failure of a network interface can effectively sever communication to its entire device, thus creating the appearance of secondary faults in the device. A fault propagation model of a complete network is often constructed from the modeled behavior of network elements and the network layout. Once constructed, the propagation model is used during live fault diagnosis to reason about the network monitoring data that are available to an NMS, such as SNMP queries and traps, periodic polling, and other mechanisms that allow monitoring of the state of various network elements. Based on the results of the reasoning over the fault propagation model, the fault is localized.

Various approaches to solve the diagnosis problem have included expert systems, neural networks, fuzzy logic, max product algorithm, petri-nets, and so on. A number of groups have used variants of the fault propagation approach with a variety of model types including dependency graphs, causality graphs, coding approaches, Bayesian reasoning, and even phase structured grammars. Also, Boolean variables have been used, but they focus primarily on dealing with reasoning about reachability from the observer, i.e., the NMS. However, these techniques are quite complex. A simpler fault propagation approach is needed, such as one that enables enumeration of all possible alternative diagnostic explanations of possible faults that would give rise to the communication network monitoring results being considered.

SUMMARY OF THE INVENTION

An inventive method and apparatus for determining and enumerating all possible/valid alternative diagnostic explanations for the root cause(s) of communication network faults along with their relative likelihoods given appropriate network and device models and network monitoring results is presented. The problem is to determine the root causes of communication network faults based on network monitoring results, either given as a snapshot of the network state or as a continuous stream. Given the network monitoring results, an inventive method and apparatus diagnose these monitoring results and enumerate all possible combinations of root causes that could give rise to the communication network faults, additionally determining the relative likelihoods of those explanations. In the case of continuous operation, the resulting explanations are periodically revised.

Note that fault determination is the first step in recovering from the fault, which is outside the scope of this invention. Additionally, the proposed solution is not fully general in that it does not deal with the issue of possibly faulty monitoring results.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
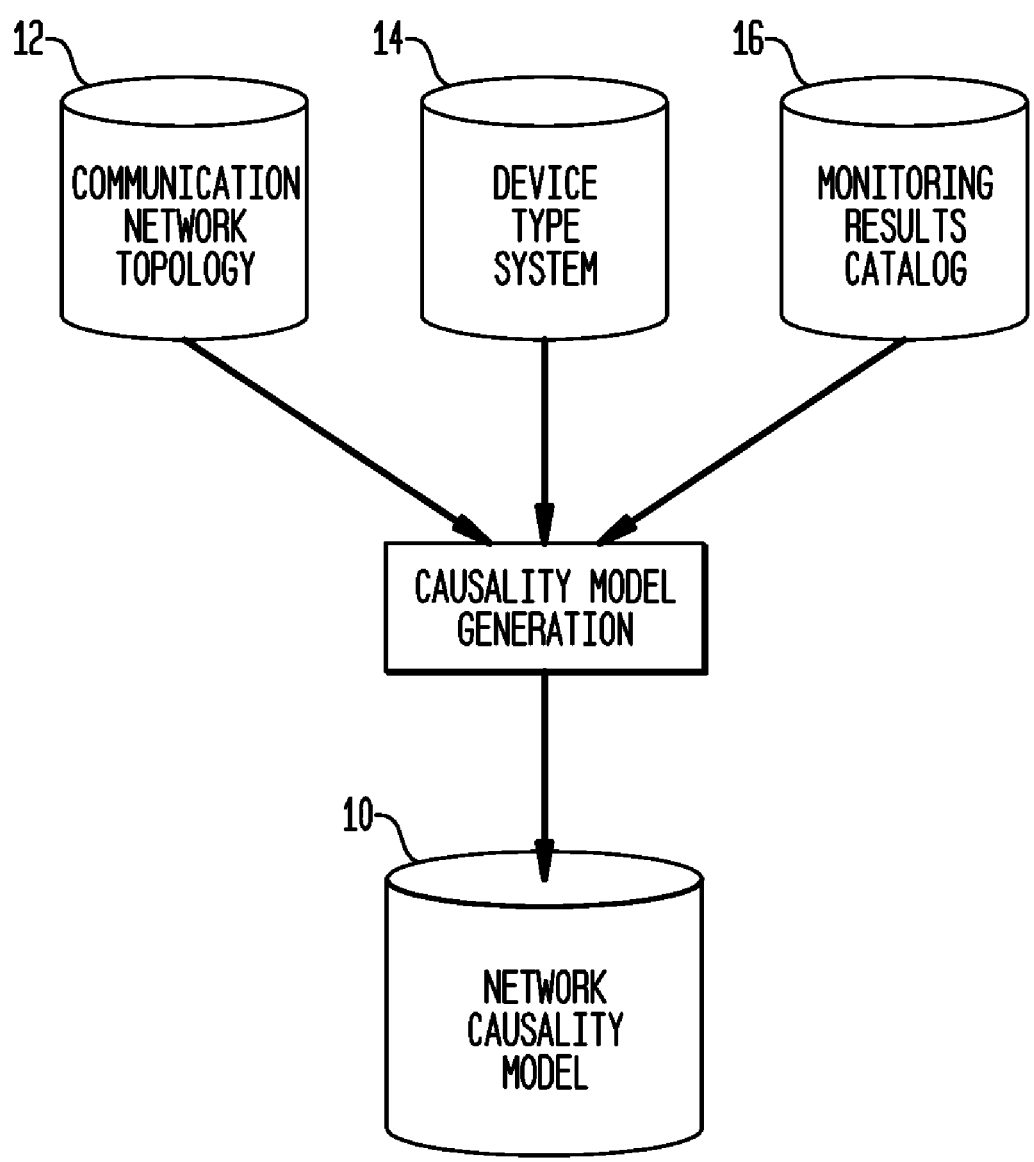
FIG. 1 is illustrates the flow of the pre-processing performed in accordance with the inventive system.

Diagnosis of network faults is a problem of reasoning in the face of missing information concerning the state of the network. With incomplete information, a network fault diagnosis is likely to have some ambiguity, which leads to the secondary challenge of how to react appropriately in the face of the ambiguity. A proper network fault diagnosis capability must therefore have two requirements. First, the diagnoses must be complete with respect to the NMS's knowledge, meaning that the diagnoses must accurately describe the space of possibilities of all root causes that lead to the network state known to the NMS and its understanding of the network. Most known network fault diagnosis mechanisms produce either the single most likely cause or the single simplest cause that might explain the observed network state. While this approach might arrive at the correct diagnosis in many cases, it will necessarily give incorrect results in more complex cases. The ambiguity of the information available plays into this complexity, so an increase in ambiguity generally results in a greater likelihood of incorrect diagnosis in existing, known fault diagnosis system.

Complete diagnostic information, while valuable, is unwieldy. Therefore, the second requirement in dealing with complete but ambiguous diagnoses is to express the ambiguity in a useful, actionable representation. To address this issue, network fault diagnoses can be represented in terms of a number of competing independent diagnostic explanations, where each explanation provides a possible set of root causes leading to the observed network state and the entire set of explanations cover all possible failures. In such a representation, each root cause failure may be associated with a relative likelihood of occurrence.

The NMS computes a failure rate, such as the probability of a failure in an hour of operation, for each independent diagnostic explanation, such as those described above. The failure rate for an explanation is based on failure rate information for known possible root causes, which are assumed to be independent. The NMS uses this information to compute the relative likelihood of each explanation and to rank the explanations by likelihood. Finally, the NMS projects alternative diagnostic explanations onto the network layout so that alternative explanations of root causes can be computed per network element or element locale. Such element-centric explanations are useful in determining where attention should be focused and in creating actionable plans for addressing the root cause failures.

Another essential element for diagnosing network faults is updating the set of diagnostic explanations as the network state changes over time. Fault diagnosis must therefore be performed in a continuous fashion, possibly revising diagnoses as new network monitoring data becomes available.

The classic Boolean satisfiability (SAT) problem is simply stated: given a set of Boolean expressions over a number of Boolean variables, discover a truth assignment to those variables that will allow all the expressions to be satisfied, e.g. evaluate to true, or alternatively, determine that no such solution exists. For example, given the expressions "x or y" and "x≠y", the assignment x=false, y=true satisfies both expressions. While solving the general Boolean satisfiability problem is inherently expensive, a great deal of research has enabled the construction of SAT solvers, which solve this class of problems, to be as efficient as possible.

For network fault diagnosis, a variant of the Boolean satisfiability can be used which, instead of finding a solution to a given satisfiability, determines the space of all possible solutions, i.e. all possible assignments that satisfy the equations. In the problem above, the complete set of solutions would be {(x=false, y=true), (x=true, y=false)}. Many of the techniques employed within SAT solvers can also be applied to this related problem.

In order to reduce the network fault diagnosis problem to a problem involving Boolean expressions, an artifact called a causality model, that is, a fault propagation model that represents the behavior of network elements in tennis of Boolean variables with constraints represented as Boolean expressions, can be used. Network monitoring information is cast into assignments to observable variables, that is, Boolean variables in the causality model that are associated with aspects of network elements that can be observed by the NMS.

For example, there might be an observable variable that indicates that the most recent poll of a particular switch interface timed out, therefore the interface is unreachable from the NMS. Each resulting diagnostic explanation contains assertions about whether each possible root cause failure is deemed to have occurred or not, or whether the root cause is indeterminate within that explanation. Each root cause variable in the model attempts to capture an independent cause of network device non-normality. A root cause variable, for example, would indicate whether the network cable has become disconnected from a particular interface on a particular network switch. While root causes are independent sources of failures, each root cause variable is related to internal state variables within the model that attempt to capture the network behavior implications of a root cause's occurrence or non-occurrence. Internal variables do not directly indicate observable or causal states in the network.

The causality model captures the salient aspects of the network's behavior in terms of Boolean variables representing primitive aspects of the state of devices within the network. The causality model is a design artifact that is constructed once per network, during pre-processing, and reused at run time each time faults are diagnosed on that network. Not surprisingly, the quality of the model has a large impact on the quality of the diagnostic explanations it generates. Issues surrounding the desired granularity of the causality model are discussed below.

The causality model for the network can be constructed automatically from element-specific causality model fragments for network elements that are stitched together, much like parts of a quilt, based on the connections between those elements in the network layout. This overall approach can be generalized to include other aspects of the network layout that can provide observations to the NMS.

The causality model for a network element is comprised of Boolean state variables linked by Boolean dependencies that capture constraints among the states associated with the variables. State variables model well-defined aspects of the network element's behavior, whether, for example, the element has power supplied, the element is up, or the element has the ability to respond to an SNMP request. Each network element will also have root cause variables indicating externally-caused failures, such as whether a device has failed, whether it is off, etc. Ultimately, within each network element causality model, these root cause variables must be related directly or indirectly to internal variables that represent behaviors of a network element that are possible to observe or that have some impact on other network elements. An interface on a switch, for example, may be non-communicative (due to a variety of causes), which will have an impact on the network connectivity to physically connected devices. The causality model mechanism provides flexibility as to the level of detail of the modeling for a device.

FIG. 1 shows a flow of pre-processing in accordance with the inventive system and method. As shown in FIG. 1, in pre-processing, three models are used to construct the Network Causality Model 10. The Communication Network Topology 12 records the devices used in the communication network, their types, and their connectivity. The Communication Network Topology 12 also records the placement of the NMS where the Correlation Process will occur. The Device Type System 14 records the possible types of devices, their characteristics, and behaviors. Device behaviors are captured as possible device states, the relationships between those states ("causes", "implies", "mutually exclusive", "or", "and", etc.), the independent root causes of failures and the mean time between failures (MTBF) of those root causes. The Monitoring Results Catalog 16 records the states of particular devices in the network that can be monitored by the NMS, and how long each such monitoring result takes to propagate to the network management system. The Causality Model Generation step uses the Communication Network Topology 12, Device Type System 14, and Monitoring Results Catalog 16 to construct a Causality Model 10.

Accordingly, the Causality Model 10 contains the states for all devices in the network, all possible root cause failures, and possible observations of network state through monitoring results. These states are interconnected with relationships described in the Device Type System 14 and generated based on the network connectivity as described in the Communication Network Topology 12 and Monitoring Results Catalog 16.

Figure 2:
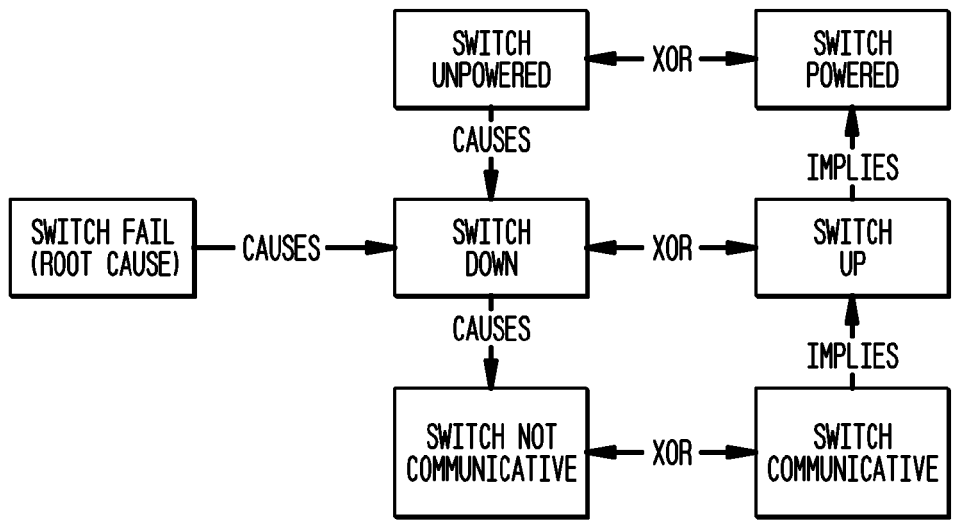
FIG. 2 is an example causality model for a switch in accordance with the inventive system.

FIG. 2 shows a simple causality model for a network switch. Each switch interface would be considered a separate component with its own causality model. In FIG. 2, "Switch Fail" is the only root cause of failures for the switch. The "xor" and "implies" dependencies have the standard logical meaning. The causes dependencies are converted into a term of an "or" expression, thus "Switch Down" is equivalent to "Switch Fail" or "Switch Unpowered." The states "Switch Up" and "Switch Down" might be observable in some network configurations.

Combining causality models of network elements can be automated readily if network element types and their causality model fragments are organized into a taxonomy and the possible connectivity relationships between network element types are properly characterized. This taxonomy can be called the Device Type System 14 or element type catalog. In practice, only a small number of such relationship types are needed in the catalog, such as: a power supplier "supplies power" to a power consumer; a component may "require container" to be up for the component to be up; or two 100 BaseT network devices/cable ends are related by the "connected" relationship. The presence of a relationship in the network layout for a given relationship type indicates how the causality model fragments will be combined into the causality model for the entire network.

In constructing the causality model for a complete network, as shown in FIG. 1 for example, each network element has instantiated for it the causality model for its type, thus creating an element-specific causality model fragment. This construction proceeds by adding dependencies among related state variables across connected network elements, a process called "stitching." For example, if a container supplies power to its parts, such as in the case of a host computer supplying power to its network interfaces, the container's "does supply power" variable will have a dependency with the component's "does receive power" variable with a Boolean equality dependency (assuming the simplest case). In the case of network reachability from the NMS, a more complex stitching mechanism will create observable variables concerning the reachability of the network element from the NMS based on variables for whether the particular element can communicate and whether the next closer network element to the NMS on the communication path is reachable. This technique can be generalized to network topologies with loops and redundant components.

Figure 3:
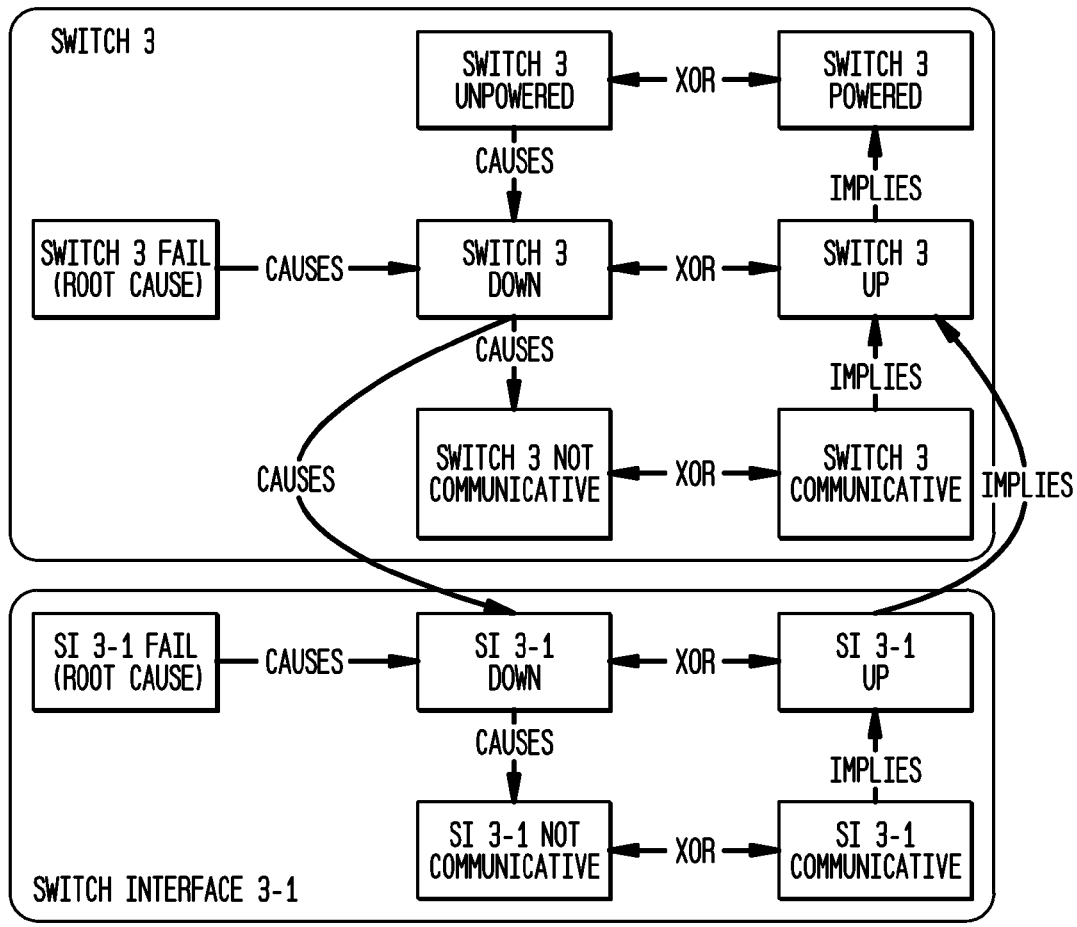
FIG. 3 illustrates stitching network element causality models in accordance with inventive system.

FIG. 3 shows an example of stitching the network element causality models for a switch and its interface which are elements related in such a way that the interface requires its containing switch to be up for the interface to be up. Stitching in this case involves adding a causes dependency and an "implies" dependency between the appropriate variables in the respective network element causality models.

Figure 4:
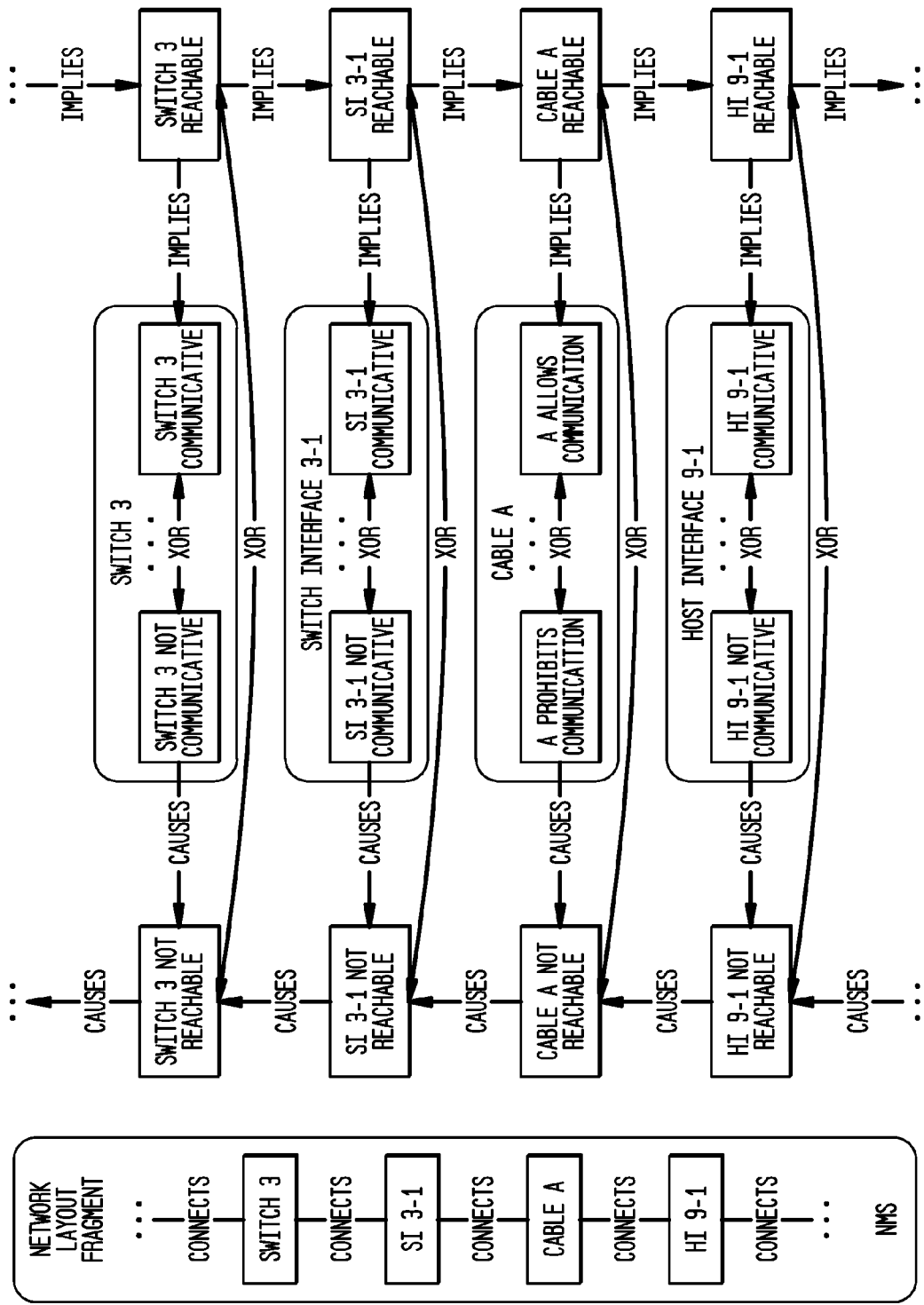
FIG. 4 illustrates stitching for network connectivity in accordance with inventive system.

Stitching related to network connectivity is more complex because reachable and not-reachable states (from the NMS) must be added and connected based on the network layout. In FIG. 4, the causality models of a host interface, cable, switch interface, and switch are stitched based on the network layout and the location of the NMS.

The final step in generating the causality model for the entire network is the creation of observable variables for aspects of the network that will actually be observed by the NMS. For example, while it is possible to observe network reachability for a particular switch interface from the NMS, if the NMS does not poll that interface, no such observation will be generated. Whether a possible observable state in a causality model actually generates an observation to the NMS depends on the actual configuration of the network element and the NMS in particular. The network causality model 10 also keeps track of upper bounds on the time it takes for the network state change to be noted by the NMS. This latency information is needed to create a practical fault diagnosis component that operates continuously.

Hence, the network causality model 10 is rapidly generated during pre-processing from the network layout or Communication Network Topology 12, the element type catalog or Device Type System 14, and information about the NMS configuration, such as the Monitoring Results Catalog 16. Thus the network causality model 10 can be treated as an internal data structure to the NMS that is constructed at NMS start up or when the network topology is known to have changed.

Figure 5:
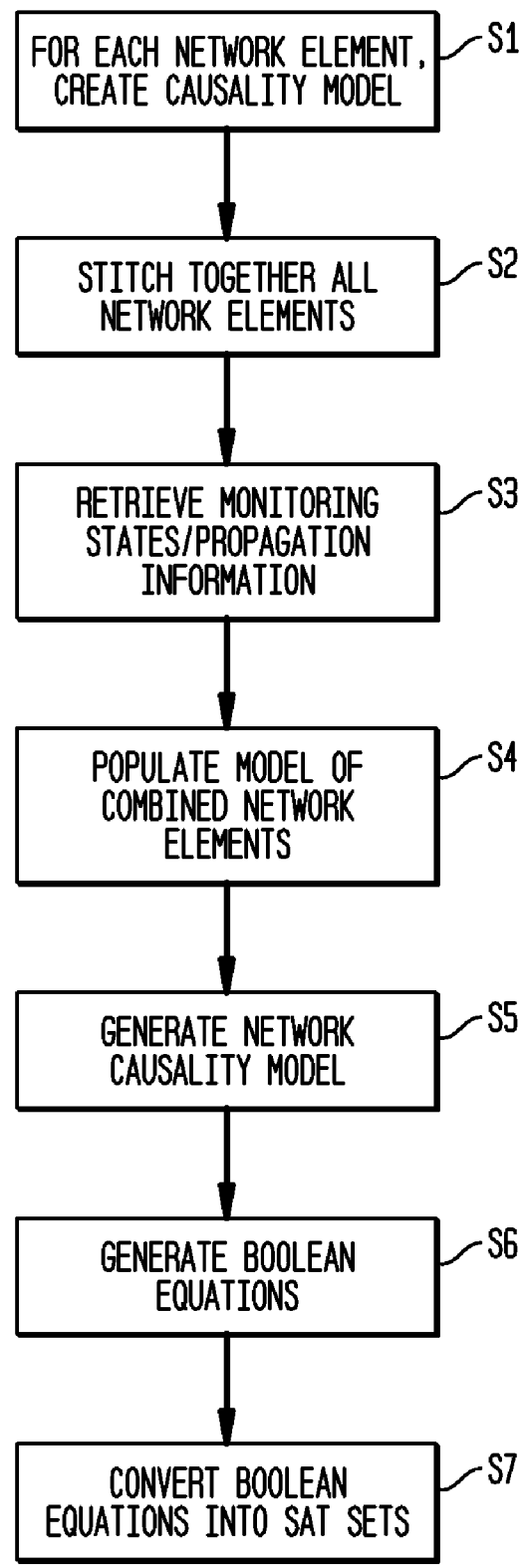
FIG. 5 is a flow diagram of pre-processing.

FIG. 5 is a flow diagram of the pre-processing steps including generation of the network causality model 10. There are two parts to the start-up or pre-processing; the network causality model 10 can be truly generated as a separate process (steps S1-S5) and saved to be read at run-time. The other steps (S5, S6) must be done during the initialization of the correlation process. In step S1, a causality model is generated for each network element. In step S2, these causality models are stitched together using the topology and placement information, obtained, for example from the Communication Network Topology 12. In step S3, information regarding the states of the network elements that can be monitored by the network management system, and how long each such monitoring result takes to propagate to the network management system is retrieved, for example from the Monitoring Results Catalog 16. In step S4, population of a graph or model of combined network elements with monitoring states and propagation information occurs. In step S5, the network causality model 10 is generated based on the information obtained in steps S1 through S4. In step S6, Boolean expressions 20 are generated based on the network causality model 10. In step S7, the Boolean expressions 20 are converted into SAT sets 18.

One example of this approach is a model of a simple network with a single switch, 6 hosts with applications running on the hosts, necessary network connectors, and a power supply. The resulting causality model can contain around 650 states, including 57 root cause variables and 64 observable variables, with around 1,100 dependencies.

Figure 6:
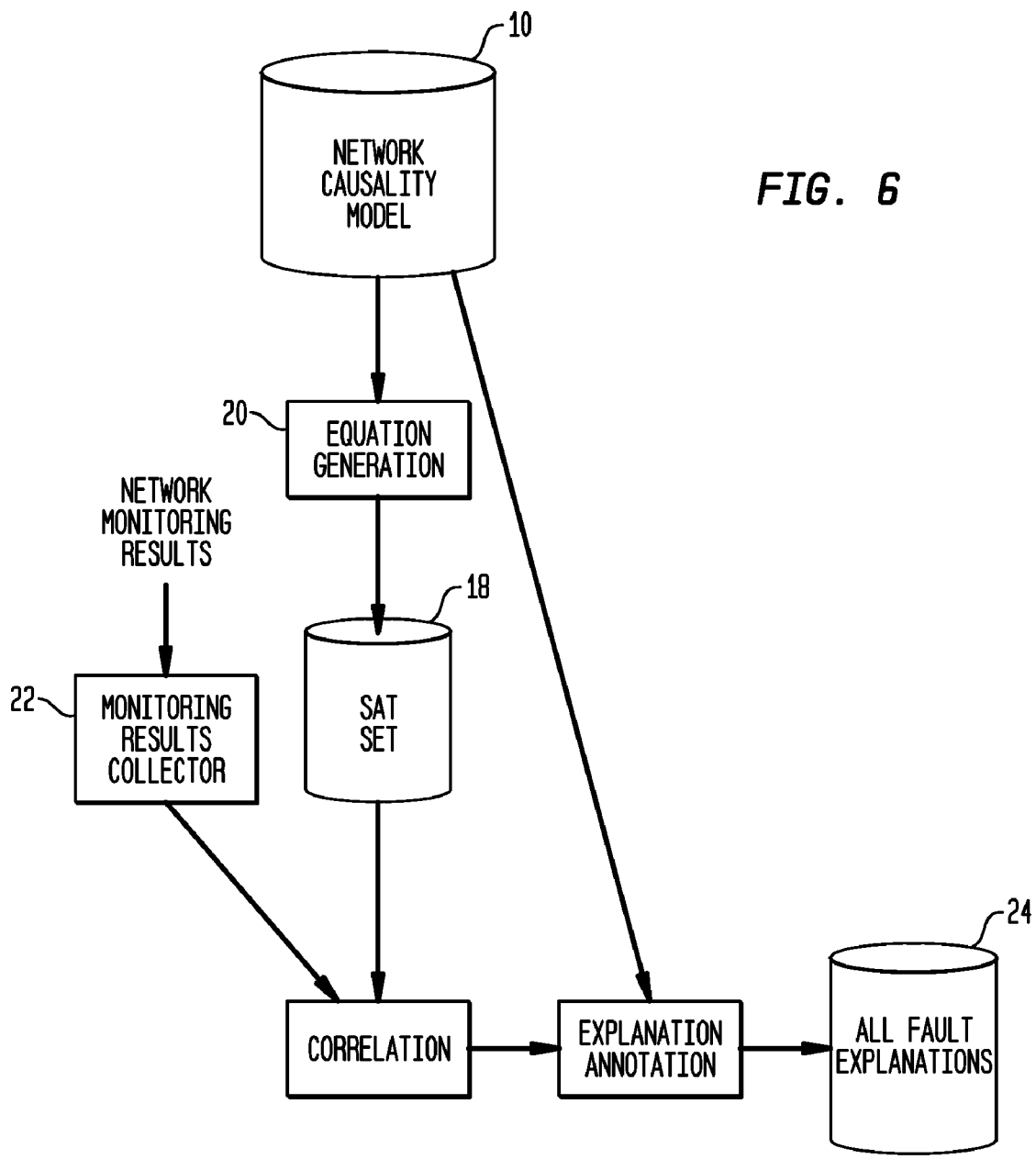
FIG. 6 illustrates the flow of the run time processing performed in accordance with the inventive system.

As shown in FIG. 6, the correlation process occurs within the NMS, the Causality Model 10 generated during pre-processing can be converted into a SAT Set 18 by generating Boolean expressions 20 from the Causality Model 10. The SAT Set 18 represents the truth value of every state in the Causality Model 10, for example as true/false/unknown, and the Boolean conditions that must hold between such states. Expressions within the SAT Set 18 are represented in conjuctive normal fowl. At run-time, as Network Monitoring Results as described by the Monitoring Results Catalog 16 arrive, they are collected by the Monitoring Results Collector 22 until the collector determines that it is likely to have all results relating to a particular network fault event. Once that has occurred, the Monitoring Results Collector 22 sends the collected monitoring results to the Correlation step where the monitoring results are applied to the SAT Set 18, yielding a simpler SAT Set (not shown) where more states are known and fewer constraints exist.

The SAT Set is further simplified to remove mention of non-root-cause states in the constrained equations. The remaining equations involve only root cause states. The simplified SAT Set expressions are then converted into disjunctive normal form (DNF). DNF represents a union (disjunction) of alterative clauses where each alternative makes a determination about each root cause: whether it has occurred, has not occurred, or is unknown. From the combined expression, each disjunction corresponds to a distinct possible explanation of the faults in the network. These possible explanations are then sent to the Explanation Annotation step where the mean time between failures of each such explanation can be computed from the root cause failures in each. Once the mean time between failures of each explanation is computed, the likelihood of each alternative explanation can be readily determined by proportionate weighting by failure rate of each explanation. The Explanation Annotation step also annotates each explanation with relevant information about devices and failure states contained in the Causality Model 10 but not needed in the earlier steps. The resulting Fault Explanations 24 enumerate all possible combinations of faults that will result in the observations seen by the network management system and the likelihood of each explanation. The result is suitable for use by human operators or automatic fault mitigation mechanisms to address the possible failures.

Figure 7:
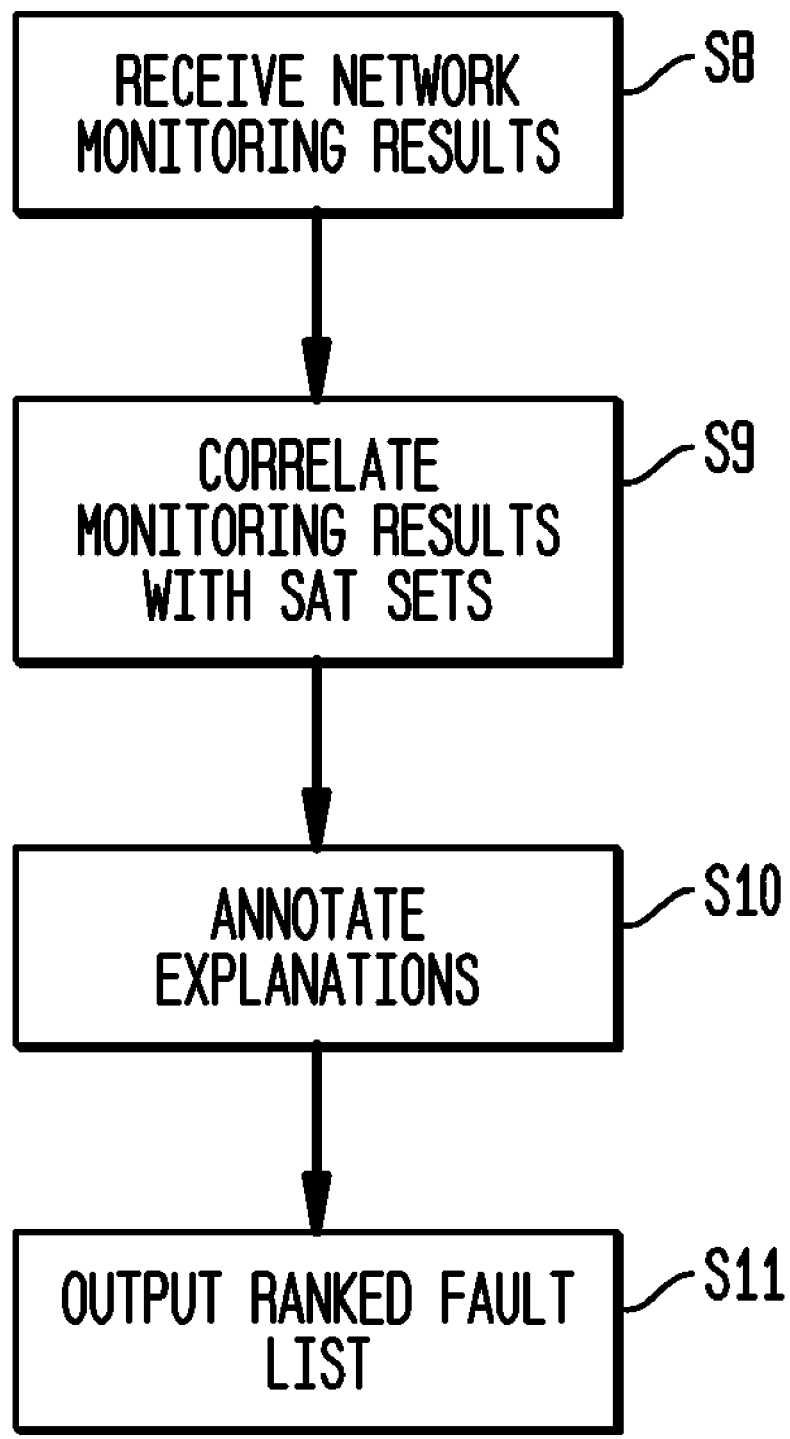
FIG. 7 is a flow diagram of run-time processing.

A flow diagram of the run time procedure is shown in FIG. 7. In step S8, which can occur prior to or simultaneously with steps S6 and/or S7 shown in FIG. 5, network monitoring results are received and collected in the Monitoring Results Collector 22. In step S9, the monitoring results are correlated with the SAT sets 18. In step S10, explanations are annotated by combining the correlated information and the network causality model 10. Step S11 performs enumerating all possible diagnostic explanations of potential faults, properly annotated. Hence, all fault explanations are produced and output as a ranked fault list. The output can be on a computer monitor or other computer or display device.

Hence, once the network causality model 10 has been created, it is treated as a system of Boolean expressions over Boolean variables to be satisfied, that is, an instance of a Boolean satisfiability problem. Internal state variables in the expressions are removed without impacting the remaining variables by applying a series of techniques, such as substituting an internal variable with an equivalent expression. This simplified SAT set is created during NMS initialization and copied for reuse each time explanations are generated from a new set of observations. When simplified, the causality model in the above example of a network with a single switch results in a SAT set with 120 variables and 230 elementary constraints. Note that simplification has the side effect of removing redundancy from the causality model.

At any given time, the NMS can generate an explanation for network failures based on the most recent values for the observations known to the NMS. Each such observation creates a Boolean binding to the corresponding observable variable which can then be applied to a copy of the simplified SAT set. The variable elimination techniques previously described are then applied to remove any unbound observable variables (corresponding to unknown observations). The remaining reduced SAT set describes a set of constraints over root cause variables only and is a compact representation of all possible diagnostic causes given the observations applied.

To generate alternative diagnostic explanations, the NMS converts the SAT set into an equivalent Boolean expression in DNF. Each DNF clause corresponds to an alternative hypothesis over root causes that explain the observations seen. The resulting hypothesis set is complete with respect to the causality model, in that no other explanations are possible. Thus, the Boolean satisfiability approach leads to a complete set of alternative diagnostic explanations for the network monitoring data seen by the NMS.

Exemplary network monitoring results can be:
Interface 1 of switch 3 is not reachable.
Interface 2 of switch 3 is reachable,
Interface 3 of switch 3 is reachable.
Interface 1 of switch 3's administrative status is up
Host 5 is not reachable
Interface 1 of host 5 is not reachable
Interface 2 of host 5 is not reachable.
. . .
Interface 1 of switch 3's operational status is unknown.
The web application running on host 5 is answering queries.
. . .
The DHCP service on host 12 is not answering queries Many devices, network elements, etc. can be monitored. The raw data will have a large stream of information, with large swaths of things that may be unknown or non-nominal because of one or more failures.

Exemplary output of the inventive system can be:
Explanation 1 (75% likelihood)
 The cable between host 1 and host 2 is disconnected and
 The DHCP service on host 12 is down
Explanation 2 (25% likelihood)
 Interface 1 of host 3 is down and
 The DHCP service on host 12 is down In this situation, there are two competing explanations that might independently explain all of the monitoring data seen. Of the two explanations, the first one is the most likely. Each explanation has two independent failures that have both occurred. Because the DHCP failure appears in all explanations, its likelihood is 100%. That is, it is known that one thing failed but the other source of problem has some ambiguity. These explanations can be provided in various formats.

It is possible to have a single explanation indicating that nothing is wrong. Generally, however, there will be some number of explanations, each with a list of independent root causes or real-world problems that can then be remedied. It is important to recognize that based on this output, there are no other combination(s) of failures that would explain the given network monitoring data.

In the above example of a network with a single switch, single failures actually existing in the simulated, single switch network give rise to observations presented to the NMS that result in one to three hypotheses, with more showing up only in the most unusual cases. An implementation written in the Java programming language can generate explanations for that network in around 100 ms running on a personal computer. These results illustrate the reasonable efficiency offered by the inventive Boolean satisfiability approach.

To make the diagnostic explanations more useful, the NMS associates each explanation with a relative likelihood so that corrective actions can be taken in likelihood order. The relative likelihood of a hypothesis in a hypothesis set is directly computed if the failure rate for each hypothesis is known. Specifically, the likelihood of a hypothesis is the failure rate of the hypothesis divided by the sum of the failure rates of all hypotheses in the set. The failure rate of a hypothesis is the product of the failure rates of the root causes in the hypothesis known to have occurred. Even if failure rates for root causes are estimated, the likelihood computation can still yield useful results because the relative ordering of hypotheses is not sensitive to such errors. Note that, if some failure is directly observed by the NMS without ambiguity, the explanations produced will all have some root cause failure. The alternative, which is that no failure is being observed, will produce a single explanation that all is well. Any single explanation will be assigned a likelihood of 1.

A number of issues arise when using this approach in the implementation of a practical system. These include model granularity, continuous operation of the NMS, dynamic network, acting on diagnostic explanations, and distributing the algorithm across NMSs. The inventive system and method deals with these issues as it applied to a variety of simulated networks.

As with all model-based approaches, there is an inherent tradeoff to be made between the accuracy of the model and its complexity. In practical situations, the causality model can be designed to have the appropriate level of detail necessary for the application at hand. For example, at design time, root causes can be related to actions that might be available to remedy those causes. It does not make sense to model fine detail of device states when remedying actions might only include actions such as restarting or replacing the network element. A related issue is the variety of types of observations available to distinguish independent root causes. To aid with this design issue, it is possible to use the SAT set 18 to identify root causes that are indistinguishable by the observations available to the NMS. Indistinguishable root causes have the undesirable effect of creating alternative hypotheses when the failure is indicated in the explanations. In one embodiment, indistinguishable causes can be combined into a compound cause that stands for either.

How to generate explanations for a given snapshot of network monitoring data known to an NMS is described above. Observations related to a particular root cause may arrive at the NMS over a relatively long time period. If one assumes that network state changes occur relatively infrequently, the observation latency information described above can be used to estimate a window in which the root cause state change that ultimately caused the observation is likely to have occurred. The longest observational latency in the network causality model 10 can therefore be used to compute an upper bound on the expected arrival time of the last observation caused by a root cause state change. Thus, the NMS can predict a time at which it is likely to have seen all observations related to a root cause state change and therefore an appropriate time to generate a new set of diagnostic explanations.

Two situations must be accounted for in the above approach. First, it is possible to have multiple root causes occurring close enough in time so that the NMS has an inconsistent snapshot of the network state. In such a situation, the observations will most likely be inconsistent with the assumptions embodied in the network causality model 10 and the simplified SAT set will be reduced to an infeasible solution. In practice, this is not a serious issue as it is an indication that more observations are expected with the explanations generated again after a suitable delay.

The second troublesome issue has to do with transient observation changes. In one embodiment, an observation preprocessing module that either filters or marks transient observations is used. Transient observations can be related to the appropriate variables in a network element causality model 10 just as any other observation. The details of these steps depend, of course, on the specific observation being considered.

Fault diagnosis in dynamic is challenging because the NMS makes sense of the network in the face of rapid change. The inventive system and method can be readily used with dynamic networks if the changes to the network layout and configuration are known to the NMS along with relevant information about the timing of the reconfiguration. Such information might be given to the NMS in the form of notifications from the network's configuration management mechanism. Given these simplifying assumptions, diagnosing faults in a dynamic network requires that the NMS stop generating explanations during the network reconfiguration and recreate the causality model based on the new configuration once it is known. Fortunately, recreating the causality model is a straightforward process as was described above.

Upon completion of the network reconfiguration, a new set of diagnostic explanations must be generated, but the most recent observations of the network state cannot necessarily be reused. This is because many observable variables in a causality model capture topology-dependent information about the network. For example, an observation about the reachability of a network component from the NMS, e.g. via polling, has something to say about all components on the network paths to the destination. Thus, when the topology changes, the simplest approach is to drop any lingering topology-dependent observations and reacquire them in the new network configuration, possibly by actively probing the network elements involved. Other analytical approaches to inferring new observations from old observations using the old and new causality models are impractical, given the complexity involved and the fact that acquiring new observations is relatively inexpensive.

While the details of acting on diagnostic explanations is outside the scope of this disclosure, it is important to emphasize the fact that actionable explanations go a long way toward the stated goal of providing useful explanations. Diagnostic explanations become actionable in two ways, either by resolving ambiguity or by taking corrective action. Resolving ambiguity is greatly aided by having a complete set of diagnostic explanations. It is straightforward to compare alternative explanations to discover the nature of the ambiguity. In many cases a set of conflicting causes can be associated with a probing action that will distinguish among them by initiating the gathering of new information. Ideally, the probe should generate new observations that would be considered by the next generation of explanations.

The diagnostic explanations generated in accordance with the inventive techniques are also useful for corrective action because the explanations are partitioned by locales in the network such as all the causes related to a switch, its interfaces, and its connections. A set of diagnostic explanations can thus be created for each locale, enabling a human or automated actor to focus attention on the area(s) of the network that need corrective action, perhaps performing corrective action for different locales in parallel.

The inventive system and method can be used in actions related to resolving ambiguity or resolving the faults and in environments with continuous operation. Furthermore, the methodology can be adapted to a wide variety of fault diagnosis applications where the system under consideration has a static topology and discrete behaviors. The inventive mechanisms for distribution are well suited to many military networks with locally-managed autonomous domains. This approach may be applicable to dynamic networks such as mobile ad hoc networks (MANETS) where network element behavior has an inherently analog nature and the distinction between failures and network topology changes need to be inferred by the NMS.

The inventive system and method provides numerous advantages over previous solutions. For example, the use of a variant of Boolean Satisfiability enables the space of all possible solutions to be efficiently represented in accordance with the classic Boolean Satisfiability approach which is to find any one single solution that satisfies the Boolean expressions. This approach allows the rapid enumeration of all possible network failure modes. The invention advantageously gives all possible explanations for the observations seen, enhancing network fault diagnosis because sometimes the actual failure is one that is unlikely and thus might be omitted from an incomplete list. Previous approaches generate a single, presumed "best", explanation for the observations.

In addition, the invention is tolerant of incomplete information, such as from missing monitoring results, which sometimes occur in practical networks. In such a case, the invention may generate more explanations or explanations with fewer definitive failure assessments. Previous methods produce no results in the face of missing information.

Further, the invention can be extended to include states and monitoring results that go beyond network elements, thus extending the solution to the network and its greater environment. For example, the state of power components can also be represented and reasoned about.

The invention allows flexibility in what device states are to be considered important by the designer and what faults are to be considered. Moreover, the models that must be generated by a designer, e.g. Communication Network Topology 12, Device Type System 14, and Monitoring Results Catalog 16 shown in FIG. 1, are simple to specify and do not require knowledge of the inventive correlation process.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for network fault diagnosis in a network having a plurality of network elements, comprising steps of:
creating a network causality model;
generating Boolean expressions from said network causality model;
converting said Boolean expressions into SAT sets;
receiving network monitoring results;
correlating said network monitoring results with said SAT sets; and
enumerating all possible diagnostic explanations of potential faults and displaying a ranked fault list having said explanations with annotations on a computer;
where the step of creating a network causality model comprising steps of:
for each network element of the plurality of network elements, creating an element-specific causality model;
stitching together all network elements using the plurality of element-specific causality models and a network topology;
retrieving monitoring state and propagation information; and
generating the network causality model using the stitched together network elements and the monitoring state and propagation information.

2. The method according to claim 1, the step of stitching together network elements comprises at least one of:
adding a causes dependency and an implies dependency between appropriate network elements; and
adding and connecting reachable and not-reachable states.

3. The method according to claim 1, wherein the element-specific causality model instantiates a type of network element.

4. The method according to claim 1, wherein the plurality of network elements and element-specific causality models are organized into a taxonomy and categorized.

5. A non-transitory computer readable medium having computer readable program for operating on a computer for network fault diagnosis in a network having a plurality of network elements, said program comprising instructions that cause the computer to perform steps of:
creating a network causality model;
generating Boolean expressions from said network causality model;
converting said Boolean expressions into SAT sets;
receiving network monitoring results;
correlating said network monitoring results with said SAT sets; and
enumerating all possible diagnostic explanations of potential faults and displaying a ranked fault list having said explanations with annotations on a computer;
where the step of creating a network causality model comprising steps of:
for each network element of the plurality of network elements, creating an element-specific causality model;
stitching together all network elements using the plurality of element-specific causality models and a network topology;

retrieving monitoring state and propagation information; and generating the network causality model using the stitched together network elements and the monitoring state and propagation information.

6. The non-transitory computer readable medium according to claim 5, the step of stitching together network elements comprises at least one of:

adding a causes dependency and an implies dependency between appropriate network elements; and adding and connecting reachable and not-reachable states.

7. The non-transitory computer readable medium according to claim 5, wherein the element-specific causality model instantiates a type of network element.

8. The non-transitory computer readable medium according to claim 5, wherein the plurality of network elements and element-specific causality models are organized into a taxonomy and categorized.

9. A system for network fault diagnosis in a network having a plurality of network elements, comprising:

a network causality model;

SAT sets; and network monitoring results, wherein the network causality model generates the SAT sets using Boolean expressions, the network monitoring results and the SAT sets are correlated to enumerate all possible diagnostic explanations of potential faults, and a ranked fault list having said explanations with annotations are displayed on a display device further comprising:

a plurality of element-specific causality models, each element-specific causality model created from one of the plurality of network elements;

a network topology; and monitoring state and propagation information, wherein the plurality of network elements are stitched together using the plurality of element-specific causality models and the network topology, and the network causality model is generated using the stitched together network elements and the monitoring state and propagation information.

10. The system according to claim 9, wherein the stitching together of the network elements comprises at least one of:

adding a causes dependency and an implies dependency between appropriate network elements; and adding and connecting reachable and not-reachable states.

11. The system according to claim 9, wherein the element-specific causality model instantiates a type of network element.

12. The system according to claim 9, wherein the plurality of network elements and element-specific causality models are organized into a taxonomy and categorized.

* * * * *